(12) United States Patent
Holle et al.

(10) Patent No.: US 7,744,665 B2
(45) Date of Patent: Jun. 29, 2010

(54) GASIFICATION METHOD AND DEVICE FOR PRODUCING SYNTHESIS GASES BY PARTIAL OXIDATION OF FUELS CONTAINING ASH AT ELEVATED PRESSURE WITH PARTIAL QUENCHING OF THE CRUDE GAS AND WASTE HEAT RECOVERY

(75) Inventors: Bernd Holle, Freiberg (DE); Manfred Schingnitz, Freiberg (DE); Norbert Fischer, Lichtenberg (DE)

(73) Assignee: Siemens Aktiengesellschaft, Munich (DE)

( * ) Notice: Subject to any disclaimer, the term of this patent is extended or adjusted under 35 U.S.C. 154(b) by 656 days.

(21) Appl. No.: 11/370,075

(22) Filed: Mar. 7, 2006

(65) Prior Publication Data

US 2007/0051044 A1   Mar. 8, 2007

(30) Foreign Application Priority Data

Sep. 3, 2005   (DE) .................. 10 2005 041 931

(51) Int. Cl.
*B01J 7/00*   (2006.01)
*H01M 8/06*   (2006.01)
*C01B 3/36*   (2006.01)
*C10J 3/46*   (2006.01)
*C10J 3/54*   (2006.01)
*C10J 3/68*   (2006.01)
*C10K 3/06*   (2006.01)

(52) U.S. Cl. .................. 48/210; 48/61; 48/197 R; 48/202

(58) Field of Classification Search .............. 48/197 R, 48/61, 202, 203, 209, 210
See application file for complete search history.

(56) References Cited

U.S. PATENT DOCUMENTS

| | | | | | |
|---|---|---|---|---|---|
| 3,988,123 | A | * | 10/1976 | Coates ........................ | 48/73 |
| 4,170,550 | A | * | 10/1979 | Kamody ..................... | 423/225 |
| 4,781,731 | A | * | 11/1988 | Schlinger ................... | 48/197 R |
| 4,872,886 | A | * | 10/1989 | Henley et al. .............. | 48/197 R |
| 5,968,212 | A | * | 10/1999 | Peise et al. ................. | 48/101 |
| 6,141,796 | A | * | 11/2000 | Cummings ................. | 60/39.12 |

(Continued)

FOREIGN PATENT DOCUMENTS

CN   20042002007.1   6/2004

(Continued)

OTHER PUBLICATIONS

Ch.Higmann, and M. van der Burgt in "Gasification" p. 124, Verlag Elsevier 2003 (Spec.p. 3 & 4) (to follow).

(Continued)

*Primary Examiner*—Alexa D Neckel
*Assistant Examiner*—Matthew J Merkling
(74) *Attorney, Agent, or Firm*—Collard & Roe, P.C.

(57) ABSTRACT

A method and device for the gasification of solid fuels such as bituminous coal, lignite coal, and petroleum coke in the flue stream, with an oxidizing medium containing free oxygen by partial oxidation at pressures between atmospheric pressure and 80 bar, and at temperatures between 1200 and 1900° C., consisting of the process steps of pneumatic metering for pulverized fuel, gasification in a flue stream reactor with cooled reaction chamber contour, partial quenching, cooling, crude gas scrubbing, and partial condensation.

14 Claims, 4 Drawing Sheets

U.S. PATENT DOCUMENTS 6,808,653 B1 * 10/2004 Muller et al. ............... 252/374
2004/0170210 A1 * 9/2004 Do et al. .................... 373/118

FOREIGN PATENT DOCUMENTS

| DE | 197131 | 10/1905 |
| DE | 3534015 | 4/1986 |
| DE | 4446803 | 6/1996 |
| EP | 0677567 | 10/1995 |
| GB | 2004993 A * | 4/1979 |
| WO | WO 96/17904 | 6/1996 |

OTHER PUBLICATIONS

J. Carl, P. Fritz, Nowell-Konversionsverfahren, EF-Verlag für Energie-und Umwelttechnik GmbH, 1996 p. 33-73 (Spec. p. 2) (to follow).

* cited by examiner

GASIFICATION METHOD AND DEVICE FOR PRODUCING SYNTHESIS GASES BY PARTIAL OXIDATION OF FUELS CONTAINING ASH AT ELEVATED PRESSURE WITH PARTIAL QUENCHING OF THE CRUDE GAS AND WASTE HEAT RECOVERY

BACKGROUND OF THE INVENTION

1. Field of the Invention

This invention relates to a gasification method consisting of the process steps of fuel infeed, gasification reaction, partial quenching, waste heat recovery, gas scrubbing, and partial condensation, to produce gases containing CO and $H_2$ by partial oxidation of pulverized fuels containing ash with a gasification medium containing free oxygen, at high temperatures and elevated pressure.

To achieve long operating times, the pressurized jacket of the gasification reactor has to be protected reliably against the action of crude gas and against the high gasification temperatures of 1200-1900° C. This is done by confining the reaction or gasification chamber with a cooled tubular shield that is hung in the pressurized jacket. The annular gap between tubular shield and pressurized jacket is flushed.

The fuel is fed to the head of the reactor through burners, using a pneumatic system following the flow transport principle. One or more fuels or varieties of coal can be gasified at the same time. The crude gas leaves the gasification chamber together with the liquefied slag at the bottom of the reactor and is then partially cooled to 700° C. to 1100° C. by injecting water, and is freed of entrained fine after recovering the waste heat. The scrubbed crude gas is then fed to further treatment steps.

2. The Prior Art

The autothermic entrained flow gasification of solid, liquid, and gaseous fuels has been known in the technology of gas production for years. The ratio of fuel to gasification medium containing oxygen is chosen so that higher carbon compounds are completely cracked for reasons of synthesis gas quality into synthesis gas components such as CO and $H_2$, and the inorganic components are discharged as molten slag; see J. Carl, P. Fritz, NOELL-KONVERSIONSVERFAHREN, EF-Verlag für Energie- und Umwelttechnik GmbH, 1996, p. 33 and p. 73.

According to various systems used in industry, gasification gas and molten slag can be discharged separately or together from the reaction chamber of the gasification device, as shown in DE 197 131 A1. Either systems with refractory linings or cooled systems are used for the internal confinement of the reaction chamber structure of the gasification system; see German Patent No. DE 4446 803 A1.

European Patent No. EP 0677 567 B1 and PCT International Publication NO. WO 96/17904 show a method in which the gasification chamber is confined by a refractory lining. This has the drawback that the refractory masonry is loosened by the liquid slag formed during gasification, which leads to rapid wear and high repair costs. This wear process increases with increasing ash content. Thus such gasification systems have a limited service life before replacing the lining. Also, the gasification temperature and the ash content of the fuel are limited. Feeding in the fuel as a coal-water slurry causes considerable losses of efficiency; see C. Higman and M. van der Burgt, "Gasification", Verlag ELSEVIER, USA, 2003. A quenching or cooling system is also described, with which the hot gasification gas and the liquid slag are carried off together through a conduit that begins at the bottom of the reaction chamber, and are fed into a water bath. This joint discharge of gasification gas and slag can lead to plugging of the conduit and thus to limitation of availability.

German Patent No. DE 3534015 A1 shows a method in which the gasification media, powdered coal and oxidizing medium containing oxygen, are introduced into the reaction chamber through multiple burners in such a way that the flames are mutually deflected. The gasification gas loaded with powdered dust flows upward and the slag flows downward into a slag-cooling system. As a rule, there is a device above the gasification chamber for indirect cooling utilizing the waste heat. However, because of entrained liquid slag particles there is the danger of deposition and coating of heat exchanger surfaces, which hinders heat transfer and may lead to plugging of the pipe system and/or erosion. The danger of plugging is counteracted by taking away the hot crude gas with a circulated cooling gas.

Ch. Higmann, and M. van der Burgt in "Gasification", page 124, Verlag Elsevier 2003, describe a method in which the hot gasification gas leaves the gasifier together the liquid slag and directly enters a waste heat boiler positioned perpendicularly below it, in which the crude gas and the slag are cooled with utilization of the waste heat to produce steam. The slag is collected in a water bath, while the cooled crude gas leaves the waste heat boiler from the side. A series of drawbacks detract from the advantage of waste heat recovery by this system; in particular, the formation of deposits on the heat exchanger tubes, which lead to hindrance of heat transfer and to corrosion and erosion, and thus to lack of availability.

Chinese Patent No. CN 200 4200 200 7.1 describes a "Solid Pulverized Fuel Gasifier", in which the powdered coal is fed in pneumatically and gasification gas and liquefied slag are introduced into a water bath through a central pipe for further cooling. This central discharge in the central pipe mentioned is susceptible to plugging that interferes with the overall operation, and reduces the availability of the entire system.

SUMMARY OF THE INVENTION

It is therefore an object of the invention, to provide a process that takes into account the different ash contents of fuels and has high availability, with reliable operation.

The method according to the invention provides for gasification of solid fuels containing ash with an oxidizing medium containing oxygen, in a gasification chamber designed as an entrained flow reactor, at pressures between atmospheric pressure and 80 bar, in which the reaction chamber contour is confined by a cooling system, with the pressure in the cooling system always being kept higher than the pressure in the reaction chamber.

In the method, the fuel, e.g. bituminous coal or lignite coke, or mixtures of different coals, is dried and pulverized to a grain size of <200 μm, and is fed through an operational bunker to a pressurized sluice, in which the pulverized fuel is brought to the desired gasification pressure by feeding in a non-condensing gas such as $N_2$ or $CO_2$. Different fuels can be used at the same time. By using more than one of these pressurized sluices, they can be filled and pressurized alternately. The pressurized powder is then sent to a metering tank, in the bottom of which a very dense fluidized bed is produced by likewise feeding in a non-condensing gas; one or more transport pipes are immersed in the bed and open into the burner of the gasification reactor. One or more burners can be used. The fluidized powder flows through these lines from the metering tank to the burners by applying a pressure differential. The amount of flowing pulverized fuel is measured, regulated, and monitored by measurement devices and monitors. There is also the capability of mixing the pulverized fuel with water or oil and feeding it to the burner of the gasification reactor as a slurry. An oxidizing medium containing free oxygen is fed to the burner at the same time, and the pulverized fuel is converted to a crude synthesis gas by partial oxidation. The gasification takes place at temperatures between 1,200 and 1,900° C. at pressures up to 80 bar. The reactor is equipped with a cooling shield that consists of water-cooled tubes welded gas-tight.

The hot crude gas leaves the gasification reactor together with the liquid slag formed from the fuel ash, and arrives at a chamber perpendicularly under it, in which partial quenching occurs by injecting water or by feeding in a cold gas and cooling to temperatures between 700° C. and 1,100° C. At this temperature, the entrained liquid slag has been cooled to the extent that it can no longer adhere to surfaces. The crude gas cooled to temperatures of 700° C. and 1,100° C. then arrives at a waste heat boiler together with the likewise cooled solid slag, to utilize the heat for steam production. This partial quenching or partial cooling prevents or sharply reduces the risk of slag caking on the waste heat cooling pipes. The water or recycled gas condensate needed for the partial quenching is fed in through nozzles that are located directly on the jacket. The cooled slag is collected in a water bath located at the bottom of the waste heat boiler. The crude gas, cooled to 200-300° C., leaves the waste heat boiler at the side and reaches a crude gas scrubber, preferably a Venturi scrubber.

The entrained dust is thereby removed down to a grain size of about 20 µm. This degree of purity is still inadequate for carrying out subsequent catalytic processes, for example crude gas conversion. It also has to be considered that salt mists are also entrained in the crude gas, which have detached from the powdered fuel during gasification and are carried off with the crude gas. To remove both the fine dust <20 µm and the salt mists, the scrubbed crude gas is fed to a condensation step in which the crude gas is chilled indirectly by 5° C. to 10° C. Water is thereby condensed from the crude gas saturated with steam, which takes up the described fine dust and salt particles. The condensed water containing the dust and salt particles is separated in a following separator. The crude gas purified in this way can then be fed directly, for example, to a desulfurization system.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT 320 tons/hour of bituminous coal with a composition of

Figure 1:
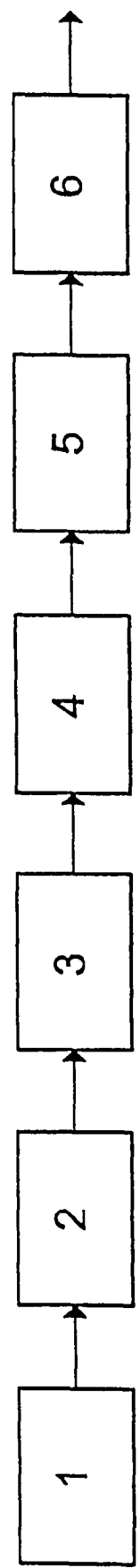
FIG. 1 shows a block diagram of the technology according to the invention.
Figure 2:
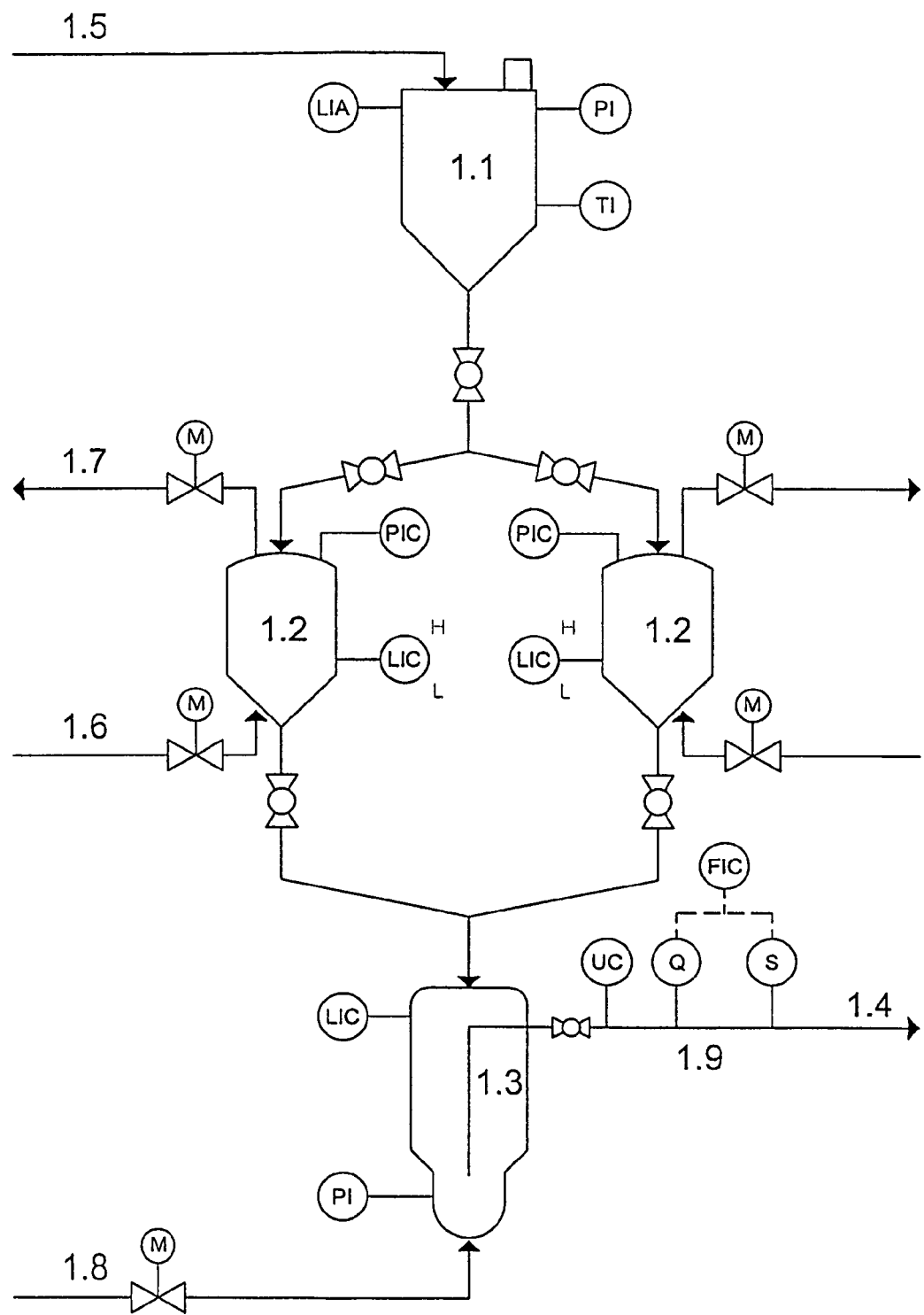
FIG. 2 shows a metering system for fluidized fuel.
Figure 3:
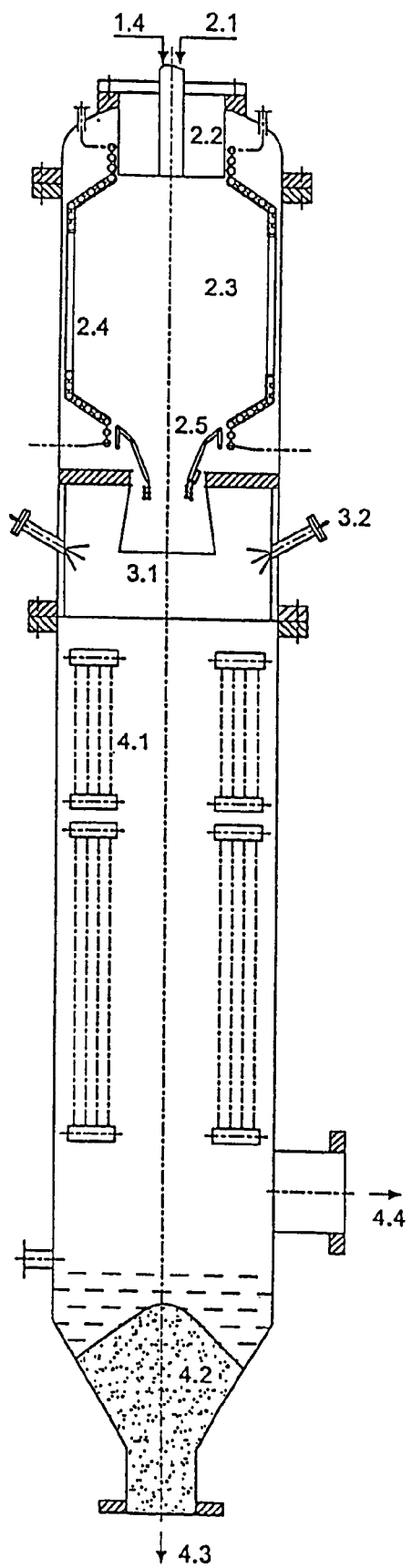
FIG. 3 shows a gasification reactor with partial quenching and perpendicularly arranged waste heat boiler.

| | |
|---|---|
| C | 71.5 wt. % |
| H | 4.2 wt. % |
| O | 9.1 wt. % |
| N | 0.7 wt. % |
| S | 1.5 wt. % |
| Cl | 0.03 wt. %, | an ash content of 11.5 wt. %, and a moisture content of 7.8 wt. %, is to be gasified at a pressure of 40 bar. The calorific value of the coal is 25,600 kJ/kg. The gasification takes place at 1,450° C. 215,000 m$^3$ i.H./h of oxygen is needed for the gasification. The coal is first fed to a state-of-the-art drier and grinder in which its water content is reduced to <2 wt. %. The grain size range of the pulverized fuel prepared from the coal present after the grinding is between 0 and 200 µm, and the amount of dried and ground pulverized fuel is 300 tons/hour. The ground pulverized fuel according to FIG. 1 is then fed to the metering system that is described in FIG. 2. The pulverized fuel then is sent through the transport line 1.5 to the supply bunker 1.1 and is supplied alternately to the pressurized sluices 1.2. Suspension is carried out with an inert gas such as nitrogen, for example, that is fed in through the line 1.6. After suspension, the pressurized pulverized fuel is fed to the metering tank 1.3. The pressurized sluice 1.2 is depressurized through the line 1.7 and can again be filled with pulverized fuel. There are three pressurized sluices in place, which are filled and depressurized alternately. For the gasification of 300 tons/hour of pulverized fuel, there are three gasification reactors according to FIG. 3, each with a metering system. A dense fluidized bed is produced in the bottom of the metering tank 1.3 by feeding in 40,000 m$^3$ i.H./h of a dry inert gas serving as transport gas, likewise nitrogen, for example, through the line 1.8; one or more dust transport lines 1.4 are immersed in the fluidized fuel bed. In this example, three transport lines 1.4 are provided in each case. The amount of pulverized fuel flowing in the transport line 1.4 is monitored, measured, and regulated in the system 1.9, and is fed to the burner of the gasification reactor 2 according to FIG. 1. The loaded density is 250-420 kg/m$^3$. The gasification reactor is explained in further detail in FIG. 3. The 300 t/h of pulverized fuel flowing into the gasification reactor through the transport lines 1.4 is subjected to partial oxidation at 1,450° C. together with the 215,000 m$^3$ i.H./h of oxygen flowing into the gasification chamber 2.3 through the line 2.1, whereby 596,000 m$^3$ i.H./h of crude gas is formed, with the following composition:

| | |
|---|---|
| $H_2$ | 20.8 vol. % |
| CO | 71.0 vol. % |
| $CO_2$ | 5.6 vol. % |
| $N_2$ | 2.3 vol. % |
| $NH_3$ | 0.003 vol. % |
| HCN | 0.002 vol. % |
| $H_2S$ | 0.5 vol. % |
| COS | 0.07 vol. %. |

Figure 4:
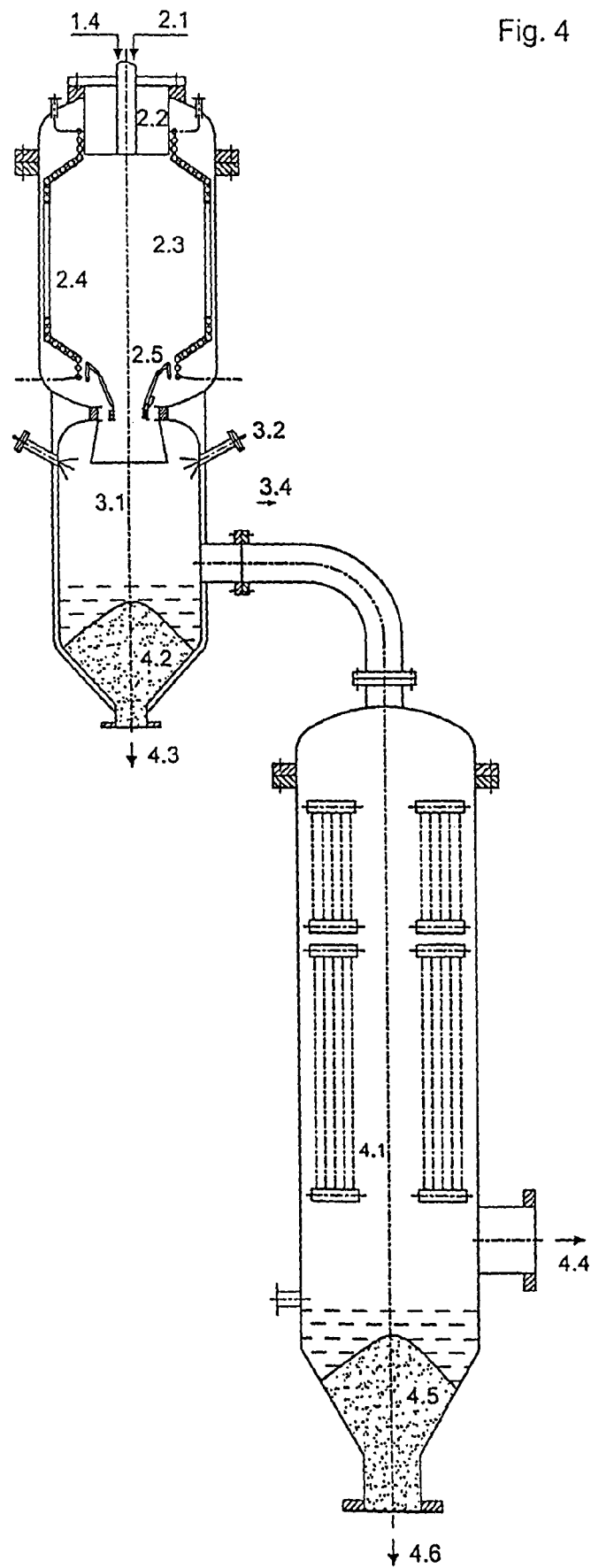
FIG. 4 shows a gasification reactor with partial quenching and adjacent waste heat boiler.

Gasification chamber 2.3 is confined by a cooling shield 2.4 that consists of a water-cooled tube system welded gas-tight. The crude gas together with the liquid slag flows through outlet opening 2.5 into chamber 3.1 for partial quenching/partial cooling of the crude gas to temperatures of 700° C.-1,100° C. At this temperature, along with the crude gas, the slag is also cooled to such an extent that it cannot be deposited in tubes 4.1 of the waste heat boiler that follows according to FIG. 1. The steam generated in waste heat boiler 4 is utilized in the process to preheat the oxidizing medium containing oxygen or as a gasification moderator, or otherwise. The slag is collected in a water bath 4.2 located at the bottom of the waste heat boiler and is discharged through 4.3. The crude gas leaves the waste heat boiler through 4.4 and arrives at the crude gas scrubber 5 according to FIG. 1. Waste heat boiler 4, however, can be located according to FIG. 3 directly beneath gasification reactor 2 and partial quencher 3, but also, as shown in FIG. 4, beside it. In this case, there is a slag discharge 4.3 beneath partial quencher 3 and also one below waste heat boiler 4.6. The crude gas leaving waste heat boiler 4 through outlet 4.4 then arrives at crude gas scrubber 5 according to FIG. 1, which is an adjustable Venturi scrubber to which is fed about 100 m³/h of wash water. The wash water is freed of absorbed solids in the usual way and is fed again to the Venturi scrubber. The wash water can be preheated in order to wet the crude gas further at the same time as the washing. To remove fine dust <20° m in size and salt mists not separated in the Venturi scrubber, the water-washed crude gas is subjected to partial condensation 6 according to FIG. 1, with the crude gas being chilled indirectly from 220° C. to 210° C. The finest dust and salt particles are taken up by the steam condensing during the chilling and are thus removed from the crude gas. The crude gas cleansed of solids then has the following composition:

| | | |
|---|---|---|
| $H_2$ | 9.5 | vol. % |
| CO | 31.2 | vol. % |
| $CO_2$ | 2.6 | vol. % |
| $N_2$ | 1.1 | vol. % |
| $NH_3$ | 0.001 | vol. % |
| HCN | 0.001 | vol. % |
| $H_2S$ | 0.200 | vol. % |
| COS | 0.03 | vol. % |
| $H_2O$ | 54.60 | vol. % |

The purified, wet crude gas amounts to 1,320,000 m³ NTP/hour. It can be directly sent to a crude gas converter or to other treatment steps.

Accordingly, while only a few embodiments of the present invention have been shown and described, it is obvious that many changes and modifications may be made thereunto without departing from the spirit and scope of the invention.

LIST OF REFERENCE SYMBOLS USED

1 Pneumatic metering system for pulverized fuel
1.1 Bunker
1.2 Pressurized sluice
1.3 Metering tank
1.4 Transport line
1.5 Transport line for pulverized fuel
1.6 Line of inert gas into 1.2
1.7 Depressurization line
1.8 Line for inert gas into 1.3
1.9 Monitoring system
2 Reactor
2.1 Line for oxygen
2.2 Burner
2.3 Gasification chamber
2.4 Cooling shield
2.5 Outlet opening
3 Quenching cooler
3.1 Quenching chamber
3.2 Nozzle in 3
3.3 Outlet from 3.1
4 Waste heat boiler
4.1 Cooling pipe
4.2 Slag
4.3 Outlet from 3
4.4 Opening from 4 to the crude gas scrubber 5
4.5 Slag in 4
4.6 Slag opening in 4
5 Crude gas scrubber
6 Condenser, partial condensation

What is claimed is:

1. A method for the production of gases containing CO and $H_2$ with fine dust <25 μm, by gasification of solid fuels containing ash, such as bituminous coal, lignite coal, and petroleum coke in the flue stream with an oxidizing medium containing free oxygen, at temperatures between 1200° C. and 1900° C., and pressures between atmospheric pressure and 8 MPa, and for waste heat recovery, comprising the following steps:

feeding a pulverized fuel with a water content of <10 wt. %, and a grain size <200 μm to a pneumatic metering system, with the pulverized fuel arriving in at least one pressurized sluice through a bunker;

bringing the pulverized fuel to a pressure between atmospheric pressure and 8 MPa (80 bar) with a condensate-free gas;

feeding the pulverized fuel to a metering tank into the bottom of which is fed an inert gas, so that a fluidized bed is formed with a density of 350 to 420 kg/m³;

feeding the pulverized fuel through a transport pipe to a reactor together with an oxidizing medium containing free oxygen;

subjecting the pulverized fuel to partial oxidation in a reaction chamber of the reactor, said chamber having a cooling shield, to yield crude gas and ash;

melting the ash;

transferring the melted ash together with hot crude gas at a bottom of the reactor through a discharge device to a quenching cooler;

subjecting the crude gas together with the liquid slag formed from the fuel ash to partial quenching in a quenching chamber of the quenching cooler, the quenching chamber having no internals and being arranged perpendicularly under the reactor, with the partial quenching taking place at temperatures between 700 and 1,100° C., collecting the cooled slag in a first water bath located at a bottom of the quenching chamber;

passing the partially quenched gas from the quenching chamber to a vertically arranged waste heat boiler located beside the quenching chamber, the waste heat boiler having vertically arranged cooling tubes for steam generation, wherein there is an opening in the waste heat boiler at the bottom of the tubes for the crude gas and a slag discharge with a second water bath;

spraying water necessary for partial quenching through nozzles arranged in one or more nozzle rings and being flush with an inner jacket of the quenching cooler;

recovering waste heat from the partially quenched crude gas in the waste heat boiler;

subjecting the crude gas to a crude gas scrubber to be cleansed of entrained fine dust; and subsequently subjecting the crude gas to partial condensation by indirectly cooling down by 5 to 10° C.

2. A method pursuant to claim 1, wherein the oxidizing medium is introduced into the pulverized fuel at a pressure between 25 and 45 bar.

3. A method pursuant to claim 1, wherein the condensate-free gas is nitrogen.

4. A method pursuant to claim 1, wherein the crude gas scrubber is a single- or multiple-stage Venturi scrubber.

5. A method pursuant to claim 4, wherein Venturi scrubber is supplied with fresh water or recycled condensates that are produced by the cooling of the crude gas.

6. A method pursuant to claim 1, wherein the waste heat boiler is operated at temperatures of 700 to 1,100° C.

7. A method pursuant to claim 1, wherein the crude gas scrubbing takes place at temperatures of 200 to 300° C.

8. A method pursuant to claim 4, wherein the Venturi scrubbers are supplied with circulated water or recycled condensate.

9. A method pursuant to claim 1, wherein the fuel is supplied to the reactor as a fuel-in-water slurry or as a fuel-in-oil slurry.

10. A method pursuant to claim 1, wherein the fuel is supplied to the reactor through one or more burners.

11. A method pursuant to claim 1, wherein granulated slag is discharged through one or more outlets from the quenching chamber.

12. A method pursuant to claim 1, wherein the quenched crude gas leaves the quenching chamber through one or more gas outlets.

13. A method pursuant to claim 1, wherein one or more varieties of coal are gasified at the same time.

14. A method pursuant to claim 1, wherein a volume of the pulverized fuel in the supply pipe is measured, monitored, and regulated.

* * * * *